United States Patent
Thomas (10) Patent No.: US 7,498,986 B2
(45) Date of Patent: Mar. 3, 2009

(54) METHODS AND SYSTEMS FOR LOCATING ACTUATORS FOR IMPROVISED EXPLOSIVE DEVICES

(75) Inventor: Steven H. Thomas, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 11/294,864

(22) Filed: Dec. 5, 2005

(65) Prior Publication Data
US 2008/0129600 A1 Jun. 5, 2008

(51) Int. Cl.
G01S 3/02 (2006.01)
(52) U.S. Cl. ..................................... 342/465
(58) Field of Classification Search ............... 342/365, 342/464, 465, 14, 357.02
See application file for complete search history.

(56) References Cited

U.S. PATENT DOCUMENTS

| | | | |
|---|---|---|---|
| 3,116,471 A * | 12/1963 | Coop | ................ 367/3 |
| 4,173,760 A | 11/1979 | Garrison | |
| 5,008,679 A | 4/1991 | Effland et al. | |
| 5,706,010 A | 1/1998 | Franke | |
| 5,719,584 A | 2/1998 | Otto | |
| 6,018,312 A | 1/2000 | Haworth | |
| 6,317,688 B1 * | 11/2001 | Bruckner et al. | ........... 701/213 |
| 6,441,779 B1 * | 8/2002 | Bennett et al. | ......... 342/357.11 |
| 6,549,762 B1 | 4/2003 | Hirabe | |
| 6,567,669 B1 | 5/2003 | Groome | |
| 6,618,009 B2 | 9/2003 | Griffin et al. | |
| 7,006,838 B2 | 2/2006 | Diener et al. | |
| 2003/0052823 A1 * | 3/2003 | Carroll | ................ 342/465 |
| 2007/0063886 A1 * | 3/2007 | Brumley et al. | ............. 342/13 |

* cited by examiner

*Primary Examiner*—Thomas H Tarcza
*Assistant Examiner*—Nga X Nguyen
(74) *Attorney, Agent, or Firm*—Fogg & Powers LLC (57) ABSTRACT

A method for determining the location of an actuating device is described. The method includes receiving transmissions from the actuator utilizing a plurality of multiple channel receiving devices, determining a direction to the actuator based on the signals received, and retrieving position, orientation, and time information for the plurality of multiple channel receiving devices relating to each transmission received from the actuator. Also included in the method is triangulating the position of the actuator based on the position, orientation, time, and determined direction to the actuator for the plurality of multiple channel receiving devices. Systems that perform the above method are also described.

19 Claims, 7 Drawing Sheets

FIG. 1

Jammer Characteristics:

| Cat | Type | D/F | Modulation | Multiple Access | Frequency Range Tx | Full Duplex Rec/Base/Handset | Freq Range | Number Channels | Channel Bandwidth | Peak Tx Power |
|---|---|---|---|---|---|---|---|---|---|---|
| | Units | | | | MHz | MHz | MHz | | KHz | Watts |
| 1 | Radio Controlled Derives | | | | | | | | | |
| | Aircraft, car, boat | | OOK | | 26.48-28 | | | 140 | 10 | |
| | Aircraft, car, boat | | | | 46.7-47 | | | 20 | 20 | |
| | Aircraft, car, boat | | | | 50.800-50.980 | | 0.20 | 10 | 20 | |
| | Model aircraft | | | | 72-73 | | 1.00 | 50 | 20 | 0.8 |
| | Model surface craft | | | | 75.4-76 | | 1.60 | 30 | 20 | |
| 2 | Cordless and Cell Phones | | | | | | | | | |
| 2a | Cordless Phones | | | | | | | | | |
| | Anal 46-49 MHz | D | | | 43.72-46.97 | 48.76-49.97 | | | 20/40/60/80 | |
| | Dig 900 MHz (Normal**) | D | | | 902.100-903.870 | 926.100-927.970 | 4.00 | 25 | 30 | |
| | Dig 800 MHz | F | | | 862-870 | | | 60 | | |
| 2b | Cell Phones | | | | | | | | | |
| | Tx (800): IS-95 N American | D | | | | (+45 MHz) | | | | |
| | Bands Ax, A,B,Ay,By | | QPSK/OQPSK | CDMA/FDM | 824-849 | 869-894 | 25.00 | 798 | 30 | 4.0 |
| | Tx (1900) Bands D,B,E,F,C | D | | | 1850-1910 | 1930-1990 | 60.00 | 1841 | 30 | |
| | | | | | | | | | | |
| | GSM 900 | F | GMSK | TDMA/FDM | 880-915 | 925-960 | 35.00 | 124 | 200 | |
| | GSM 1800 | F | GMSK | TDMA/FDM | 1710-1785 | 1805-1880 | 75.00 | | | |
| | GSM 1900 | F | | TDMA/FDM | 1850-1910 | 1930-1990 | 60.00 | | | |
| 3 | FRS/GMRS/Land Com | | | | | | | | | |
| 3a | FRS | | | | 462.5625 - 462.7125 & | 467.5625 - 467.7125 | 0.18 | 14 | 25 | 0.5 |
| 3b | GMRS | | | | | | | | | |
| | Simplex mode | | | | 462.5625 - 462.7125 | | 0.18 | 7 | 25 | 5.0 |
| | Duplex mode | | | | 462.550 - 462.725 | 467.550 - 467.725 | 0.20 | 8 | 25 | 5.0 |
| 3c | Land Com/FKS | D | | | 138-144 | | 4.00 | | | |
| 4 | Wireless chimes/doorbells | F | Pulse Code | | 235-300/300-322 | | | | 25 | |
| | | D | | | 300-314 | | | | 25 | |
| | | D | | | 420-450 | | | | 25 | |
| 5 | KeyFOB/Wireless Remote Access/Entry | | PRN Code | | 300-322/335-400 | | | | 25 | |
| | | D | | | 235-300 | | | | 25 | |
| | | | | | 420-450 | | | | 25 | |
| 6 | Keyless/Alarm Entries | F/D | PRN Code | | 300-322 | | | | 25 | |
| | | F | | | 335-400 | | | | 25 | |
| | | F | | | 420-450 | | | | 25 | |
| 7 | Garage Door Openers | D | PRN Code | | 300-322 | | | | 25 | |
| | | D | | | 335-400 | | | | 25 | |

METHODS AND SYSTEMS FOR LOCATING ACTUATORS FOR IMPROVISED EXPLOSIVE DEVICES

BACKGROUND OF THE INVENTION

This invention relates generally to improvised explosive devices (IEDs), and more specifically, to methods and systems for locating actuation devices for IEDs.

The rise in terrorism related casualties can be attributed, at least in part, to the rise in the use of IEDs by terrorists. For example, terrorists have used IEDs that consist of mortar and artillery projectiles that have been reconfigured as explosive devices.

These IEDs are typically planted at the roadside and then remotely detonated by the terrorist enemy. A high percentage of these IEDs are wireless and many remote detonation devices for such IEDs are fabricated utilizing low technology components that can be easily purchased from a basic electronics store. The electronics utilized to fabricate these detonation devices include wireless components that are used in garage door openers, door bells, automobile key FOB entry systems, cell phones, etc.

There is a need to not only prevent simple improvised explosive devices from killing or injuring soldiers and civilians but also to detect the locations of persons who are actuating these IEDs.

BRIEF SUMMARY OF THE INVENTION

In one aspect, a method for determining the location of an actuating device is provided. The method comprises receiving transmissions from the actuator utilizing a plurality of multiple channel receiving devices, determining a direction to the actuator based on the signals received, retrieving position, orientation, and time information for the plurality of multiple channel receiving devices relating to each transmission received from the actuator, and triangulating the position of the actuator based on the position, time, and determined direction to the actuator for the plurality of multiple antenna receiving devices.

In another aspect, a system for determining the location of an actuating device is provided. The system comprises a plurality of multiple channel receivers and a controller. Each channel of each receiver comprises a corresponding antenna, the antennas for each receiver separated by a distance, and each of the receivers is separated by a distance. Each receiver channel is configured to utilize signals received at its respective antenna to determine a direction to the actuating device. The controller is configured to receive the actuating device direction from each of the receivers and further configured to receive position, orientation, and time information from at least one external sensor for a location of each of the receivers. The controller determines a position of the actuating device, based on the direction to the actuating device and the position and time information as determined for each of the receivers.

In still another aspect, a controller for determining a direction to an improvised explosive device (IED) actuator is provided. The controller comprises a processor configured to receive transmissions relating to the direction to the IED actuator, receive transmissions relating to a position and orientation of a receiver and a time at which the receiver received the signals from the IED actuator, and determine a position of the actuating device, based on a direction to the actuating device and position, orientation, and time information received for the receiver providing the direction to the IED actuator.

DETAILED DESCRIPTION OF THE INVENTION

Described herein are methods and systems for detecting a location of an actuator utilized to detonate an improvised explosive device (IED). As a result, the person or persons who are triggering the actuator(s) can be located and dealt with in an appropriate manner.

Figure 1:
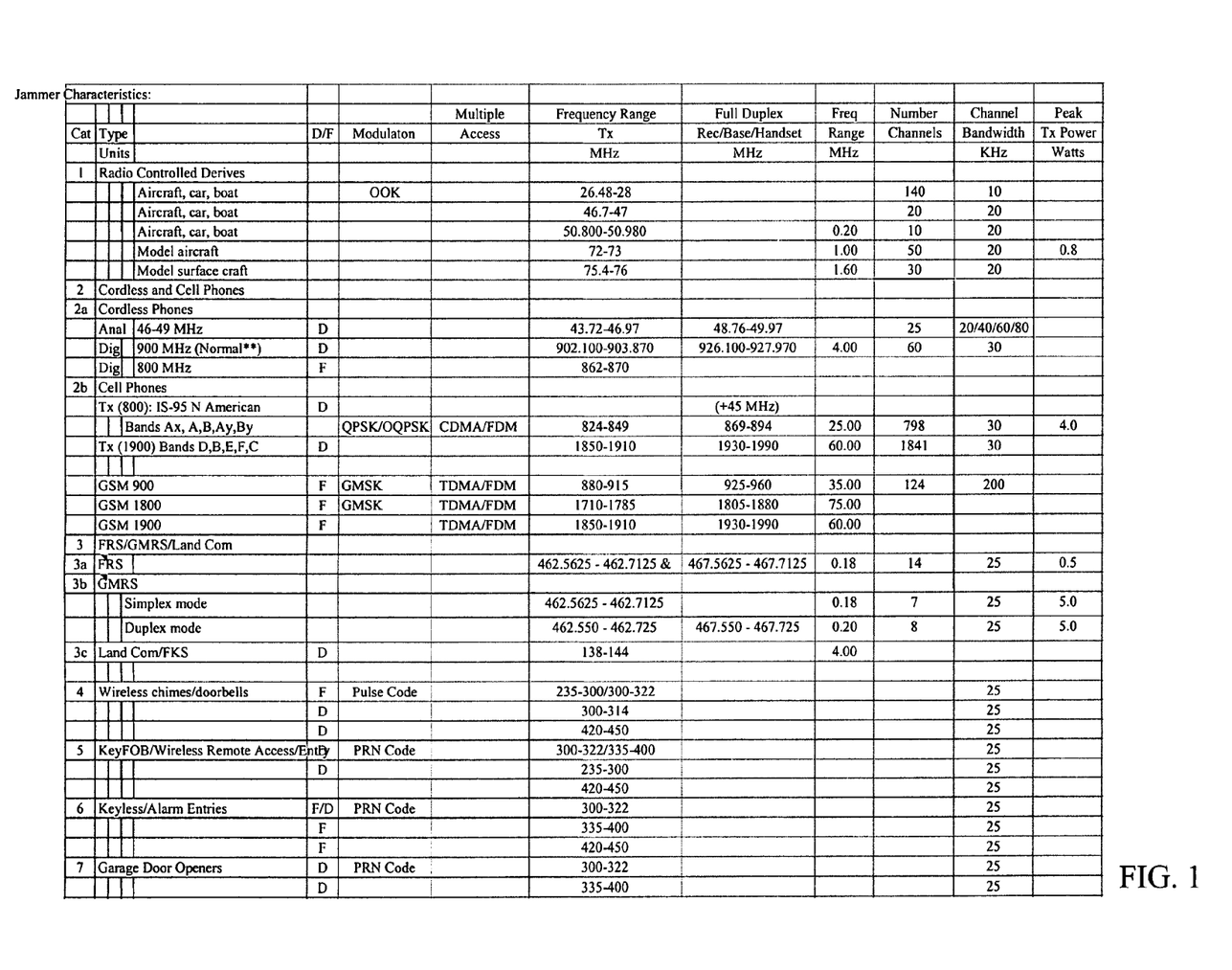
FIG. 1 is an example of a threat matrix illustrating different possible detonation signal characteristics.

The threat characteristics of the actuator/detonator vary significantly with respect to frequency, frequency band or channel(s), frequency range, modulation characteristics, actuator transmit power, and detonator receiver characteristics (i.e. bandwidth and signal-to-noise ratio). An example of a threat matrix showing different possible detonation signal characteristics is shown in FIG. 1. For example, different modulation characteristics may include one or more of OOK (on/off key modulation), DSSS (direct sequence spread spectrum modulation), TMDA (time division multiple access modulation), CDMA (code division multiple access modulation), FDMA (frequency division multiple access modulation), GMSK (Gaussian minimum shift keying modulation), and others. As a result, an actuator/detonator location system must be capable of responding to a variety of signal characteristics. In the detonation system, transmission frequencies may range from about 30 MHz to more than 1 GHz.

A jamming device may be utilized to jam the detonator receiver and prevent detonation. These devices are sometime referred to as IED jammers. Certain IED jammers are capable of being modified, as described herein, to incorporate additional techniques that determine a location of an IED actuator. Two types of IED jammer are being either developed or are in current use. The two types of IED jammer include a broadband jammer and an intelligent jammer.

Figure 2:
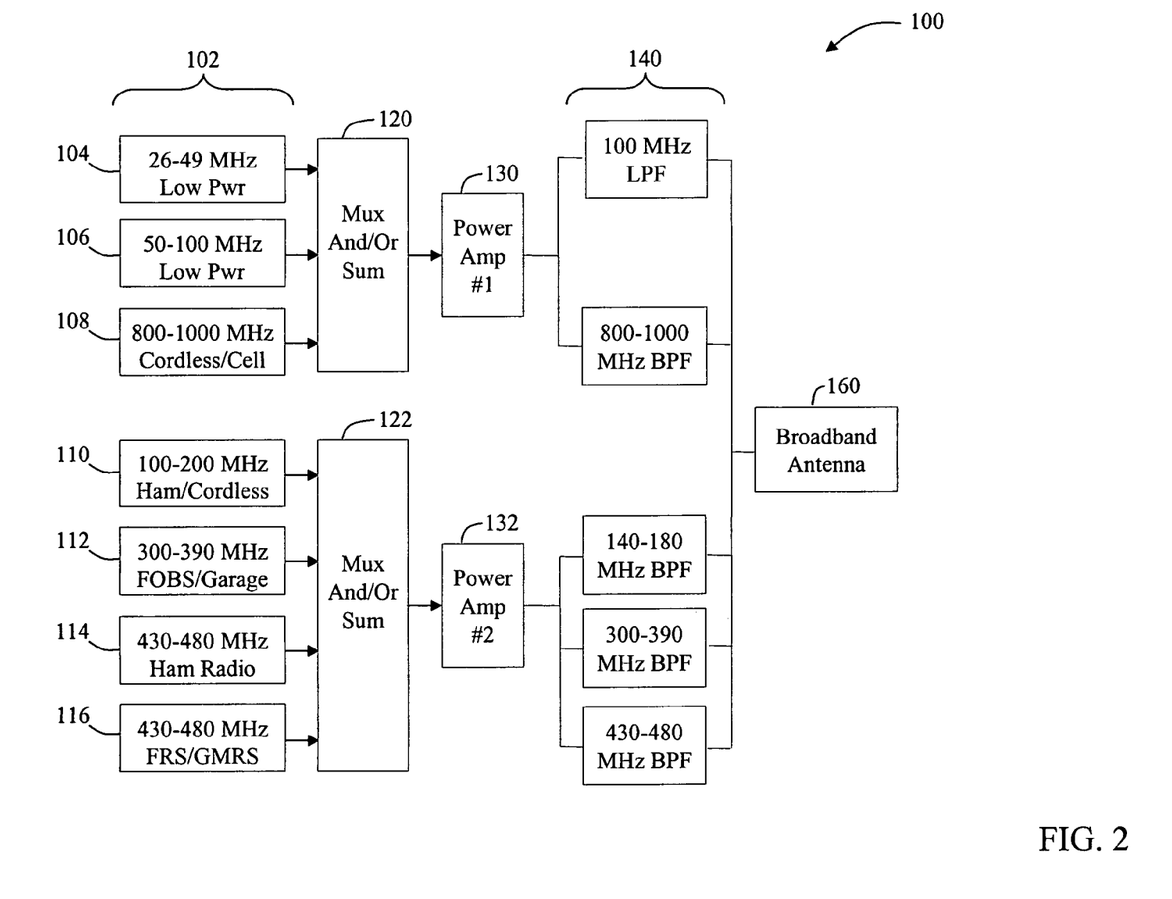
FIG. 2 is a block diagram of one embodiment of a broadband jammer.

Based on military intelligence of the specific threat characteristics of various actuators, a jammer can be designed to provide large amounts of power at the actuator characteristics (i.e., transmission frequency, modulation type, bandwidth, etc.) and can be transmitted to jam detonator receivers to prevent detonation of IEDs. This is referred to as broadband jamming. A block diagram of one embodiment of a broadband jammer 100 is illustrated in FIG. 2.

The embodiment of broadband jammer 100 includes a number of frequency generators 102 each of which provide a frequency in the range of a specific actuating device. In the embodiment illustrated, frequency generators 102 include a 26-49 MHz generator 104 and a 50-100 MHz generator 106 which provide a range of frequencies that are in the same frequency bands as a number of radio controlled devices such as model cars and boats as well as analog cordless telephones. A 800-1000 MHz generator 108 provides a range of frequencies that are in the same frequency bands as a number of cellular telephones and digital cordless telephones. Another frequency generator (not shown) may be incorporated to provide a range of frequencies that are in excess of 1000 MHz.

A 100-200 MHz frequency generator 110 provides a range of frequencies that are in the same frequency bands as Ham radios. A 300-390 MHz frequency generator 112 provides a range of frequencies that are in the same frequency bands as automobile keyless alarm fobs and garage door openers. A 430-480 MHz frequency generator 114 provides a range of frequencies and modulations that are in one of the Ham radio frequency bands, while a second 430-480 MHz frequency generator 116 provides a range of frequencies and modulation that are compatible with in the same frequency bands as family radio service (FRS) and general mobile radio service (GMRS).

In broadband jammer 100, the various frequency generators 102 have their outputs multiplexed together by one or more muxing/summing devices 120, 122 whose outputs are input into respective power amplifiers 130, 132. The outputs of amplifiers 130 and 132 are input into one or more filters 140 having pass bands consistent with the frequency ranges utilized by the various IED actuators. The signals are transmitted through a broadband antenna 160 of broadband jammer 100.

As described above, broadband jammer 100 is capable of being tuned to several different known threats (e.g., IED actuator types). In an embodiment, a broadband jamming and receiving device that incorporates the transmission characteristics of broadband jammer 100, may be configured to include multiple complementary receiver channels. These multiple complementary receiver channels can be utilized to measure signals and signal characteristics that have been transmitted by an IED actuator. By incorporating the complementary receiver channels, a jamming and receiving device is capable of actual measurement of IED actuator characteristics, including frequency. Such a jamming and receiving device then adjusts its transmission signal characteristics to jam the IED actuator.

A jamming and receiving device incorporating the receiver channels therefore provides an intelligent IED actuator detection system and method that is capable of focusing all available jamming power at a specific IED actuator's signal characteristics. In an alternative embodiment, rather than including the complementary receiver channels within a modified jamming device itself, a separate receiver module that can measure actuator characteristics may be utilized that is coupled to, for example, broadband jammer 100. As further described below, a jamming device incorporating receiver channels also can be configured to provide at least a portion of the information needed to determine a location of an IED actuator.

Figure 3:
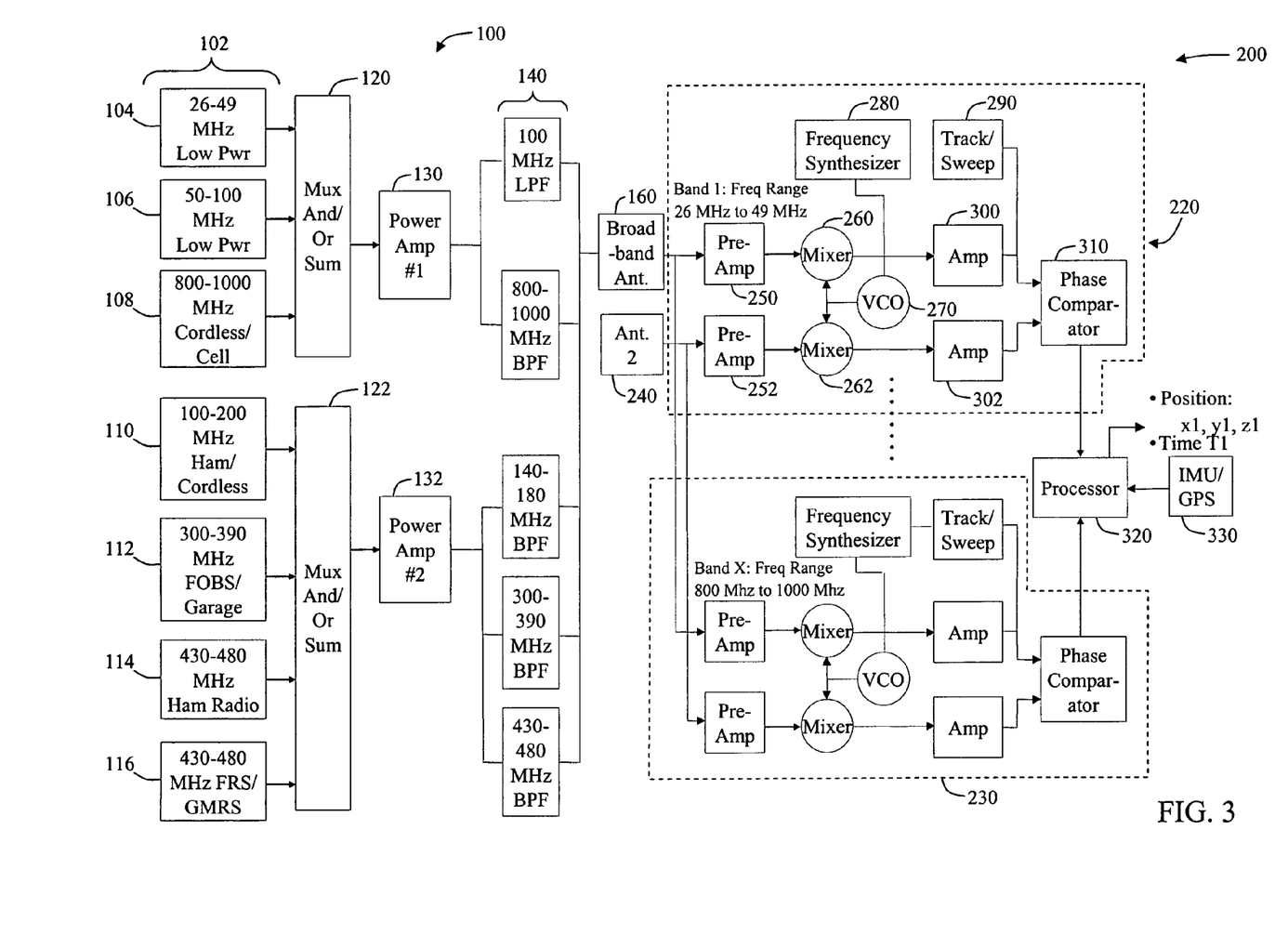
FIG. 3 is a block diagram of one embodiment of a jamming device which includes a broadband jammer as well as a plurality of complementary receiver channels.

FIG. 3 is a block diagram of one embodiment of a jamming device 200 which includes broadband jammer 100 as well as a plurality of complementary multiple receiver channels 220 and 230. As indicated in the block diagram, specific multiple receiver channels may be provided for each IED actuator frequency range. For example, for multiple receiver channel 220, the frequency range is 26 to 49 MHz. For multiple receiver channel 230, the frequency range is 800-1000 MHz and other multiple receiver channels (not shown) may be incorporated for particular frequency and modulation reception.

When receiving transmissions from, for example, an IED actuator, broadband antenna 160 of jammer 100 is switched into a receive mode and a second antenna 240, that is separated a distance from antenna 160, also receives the IED actuator transmissions. Adding second antenna 240 along with the existing broadband antenna 160 that are separated from one another by a specific distance, provides a system with a plurality of multiple receiver channels that can measure the actuator signal characteristics, and based on phase differences in the received signals, locates the source of the threat (e.g., the signal transmitted from the IED actuator). Now referring specifically to multiple receiver channel 220, pre-amps 250 and 252 receive the IED transmission signals from antennas 160 and 240 respectively and output those signals into respective mixers 260 and 262. Mixers 262 receive a frequency from voltage controlled oscillator (VCO) 270 which also outputs its signal to a frequency synthesizer 280 outputting a signal to a tracking and sweeping function 290. Utilization of a common VCO 270 maintains phase coherency.

Outputs from mixers 260 and 262 are received by respective amplifiers 300 and 302. The amplified signals are both input into a phase comparator 310, which in certain embodiments is a digital phase comparator resulting in minimal phase noise. A difference in phase of the received signals, due to separation of the antennas 160 and 240 is utilized by a processor 320, along with signals from IMU/GPS 330 to determine a position of an IED actuator. More specifically, IMU/GPS 330 provides location and time sensors and an x, y, z position along with a GPS time reference for jammer 100 and multiple receiver channels 220 and 230. IMU/GPS 330 may further provide magnetic heading, acceleration, and orientation data to processor 320.

IMU/GPS 330 provides orientation information based on accelerometers within IMU/GPS 330. To determine a direction to the IED actuator, the IMU/GPS 330 provides reference to a coordinate system, for example, a coordinate system that indicates true north and orientation. If a magnetic heading sensor with accelerometers is used instead of IMU/GPS 330, then magnetic north direction as well as orientation is provided.

As illustrated in the block diagram, signals from antennas 160 and 240 are utilized by all receiver channels, through one or more separate antennas for each receiver channel is contemplated. Further, multiple receiver channels may utilize the same processor 320 and IMU/GPS 330 for determining an IED position.

In various alternative embodiments, signal detection of IED actuator transmissions is accomplished utilizing receiver channels incorporated within a jamming device or with separate receivers in self contained modules. Other embodiments may include utilization of multiple parallel frequency synthesizers (one for each receiver channel) driven from a common oscillator, and interleaved transmit and receive functions, allowing for transmission from and reception at antenna 160. In a specific embodiment, antennas 160 and 240 are omnidirectional antennas with a bandwidth ranging from 25 MHz to in excess of 1 GHz.

Figure 4:
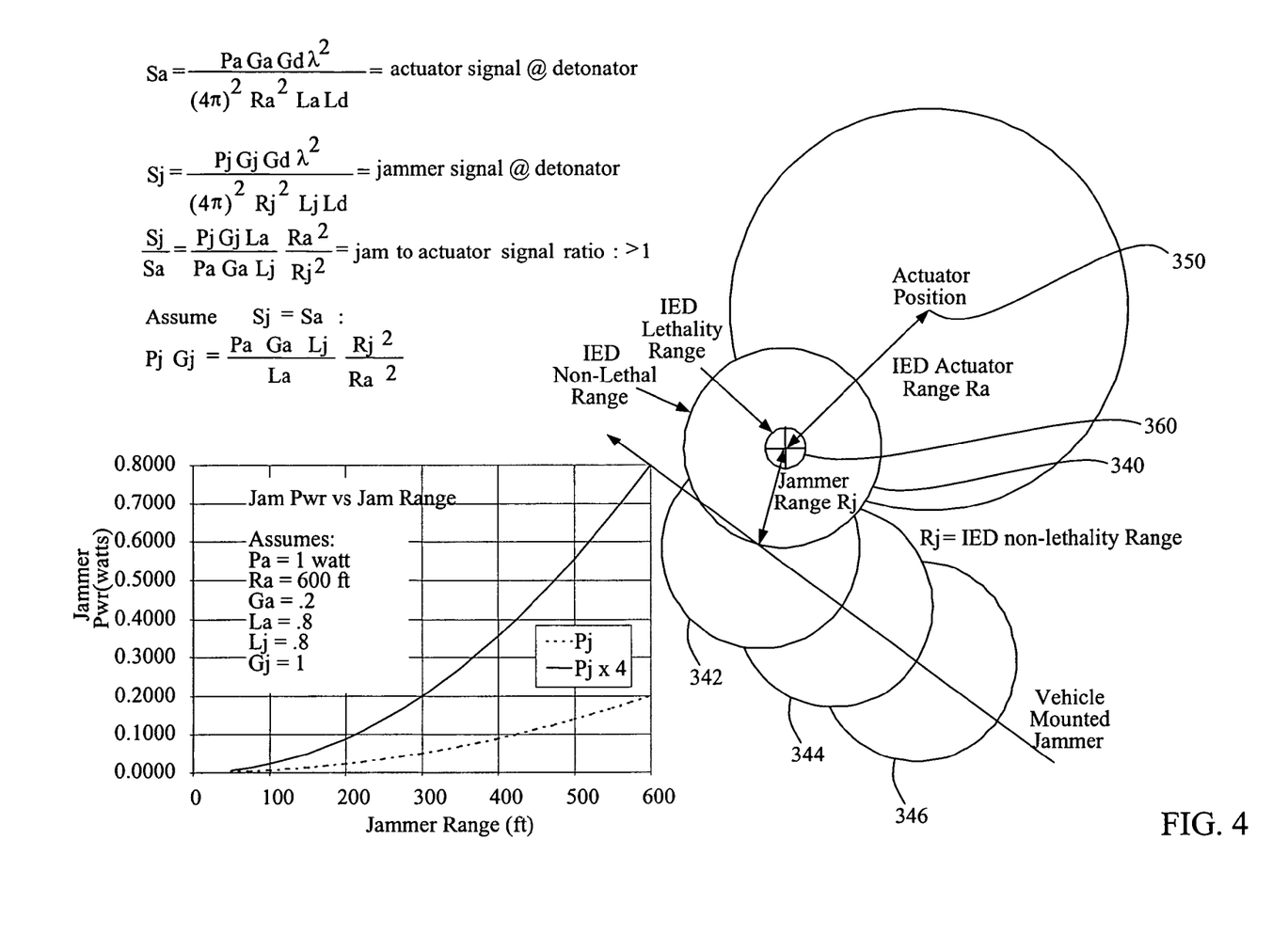
FIG. 4 is an illustration of the jamming range for each vehicle in a convoy.

In a typical scenario, the targets of many IEDs are the various types of moving vehicles that travel in convoys. FIG. 4 is an illustration of the jamming range 340 for each vehicle 342, 344, 346 in the convoy with respect to IED actuator position 350 and IED position 360. Multiple vehicles in the convoy are equipped with jamming devices. In addition to a jamming device, these vehicles typically contain a Global Positioning System (GPS) and an Inertial Measurement Unit (IMU) (IMU/GPS 330 above) that are used to determine a position, orientation, and location for the respective vehicle at all times. Further, each vehicle 342, 344, 346 includes one or more radios that are utilized to communicate with other convoy vehicles as well as a command and control (CC) center. The GPS, TMU, and the radios are devices that can be utilized in conjunction with the complementary receiver channels of a jammer for threat location determination.

With regard to frequency measurement, and as described above, multiple receiver channels similar to receiver channels 220 and 230 (shown in FIG. 3) provide a capability to receive signals from IED actuators in multiple transmitter frequency bands, therefore, multiple frequency synthesizers within the receivers are used to cover similar frequency bands. In certain embodiments, these synthesizers have high slew rates and can adjust and control frequencies within one to two kHz. Such synthesizers are programmable to sweep over multiple frequency channels. Once a threat frequency is detected, the sweep function is terminated and the VCO tracks the actuator or threat frequency.

Figure 5:
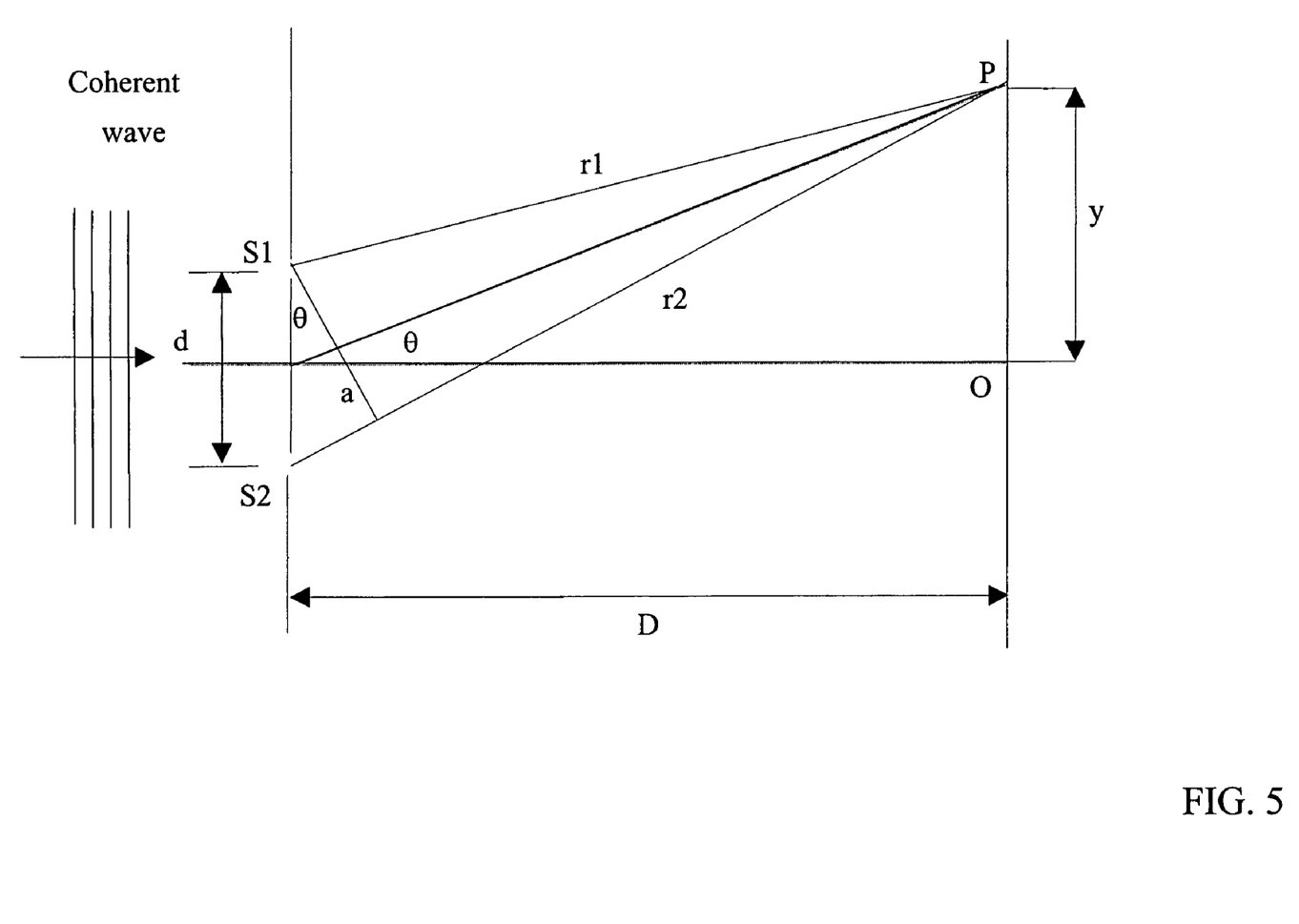
FIG. 5 is a diagram illustrating determination of direction to an improvised explosive device actuator.

Referring now to FIG. 5, a direction to the IED actuator (i.e. the actuator at point P) can be determined based on reception of transmissions from the IED actuator by the multiple antenna jamming device. For example, $S_1$ is the location of antenna 1 (broadband antenna 160) and $S_2$ is the location of antenna 2 (antenna 240). By assuming that "D" is much greater than "d" then "a" is almost perpendicular to both $r_1$ (the distance between antenna 1 ($S_1$) and the IED actuator) and $r_2$ (the distance between antenna 2 ($S_2$) and the IED actuator). With such an assumption, the angles θ are equal (i.e. $r_1$ and $r_2$ may be taken as parallel). The phase comparator will determine a difference in phase Φ between the signals received at the respective antennas. Therefore, $\theta=\sin^{-1}(\Phi\lambda/2\pi d)$, where λ is the wavelength and can be determined from the measured frequency of the actuator signal. The angle θ, along with knowing north reference and the orientation, provides direction to the actuator from each vehicle.

At large angles, a phenomenon known as "phase wrapping" may occur. "Phase wrapping" occurs when multiple numbers of wavelengths are experienced (i.e. b>λ) resulting in ambiguous phase readings. This can be resolved either by adding another antenna or using Time difference of Arrival (TDOA) of the actuator signal between the two antennas 160 and 240. The TDOA measurement will allow the system to determine the proper quadrant and the phase discrimination can then be used to measure unambiguous angle.

Figure 6:
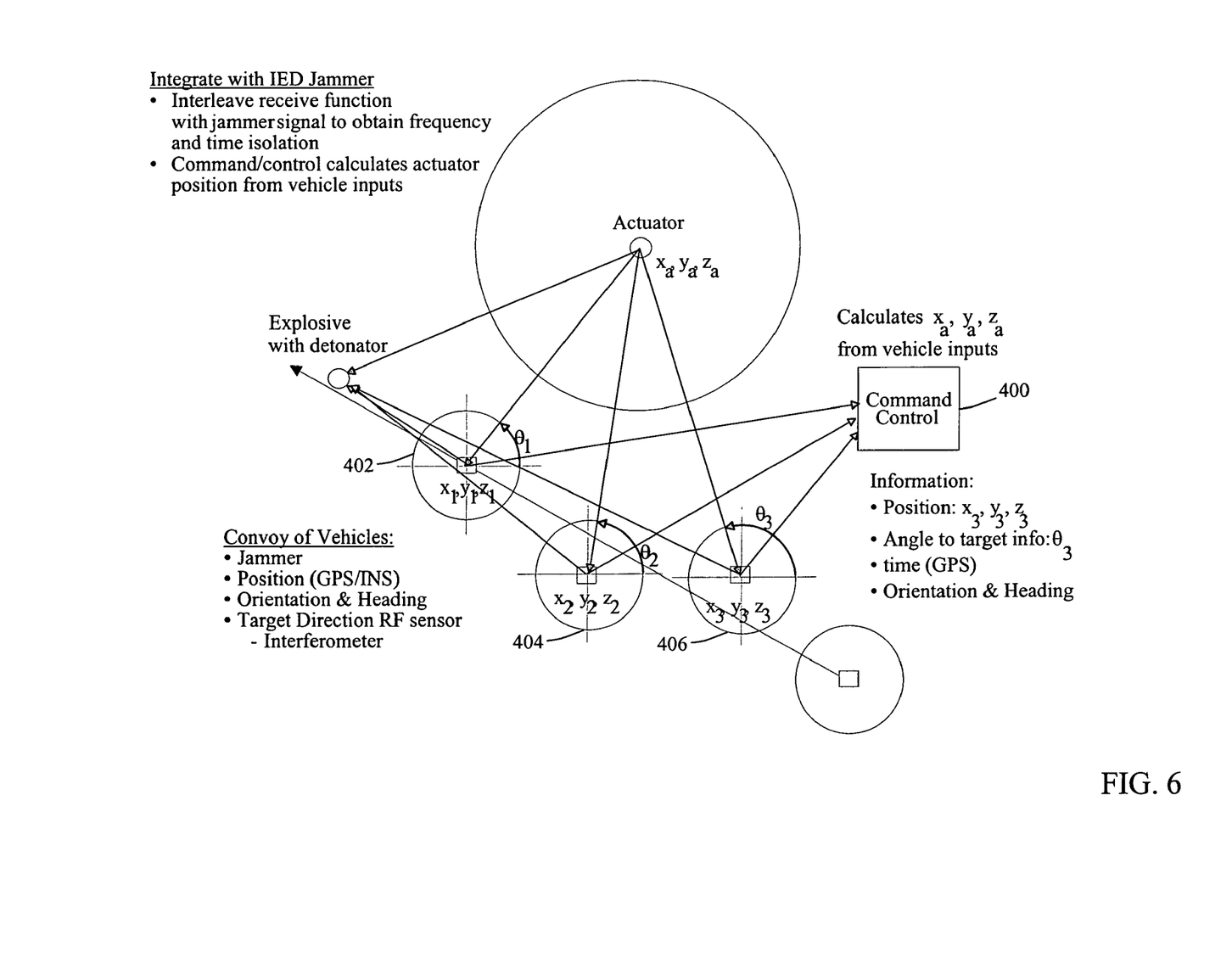
FIG. 6 is a diagram illustrating a commend center receiving data relating to actuator position from a plurality of positions.

Once direction to the actuator is determined, then vehicle position and GPS time can be transmitted to a command and control center 400 as illustrated in FIG. 6. With, for example, three vehicles 402, 404, and 406 communicating their measurements, then the actuator position can be determined by command and control center 400 through triangulation methods. In one embodiment, command and control center 400 is a processor based controller that is programmed to perform the methods described herein.

Existing wireless communications, for example, standard military radios are utilized to communicate between vehicles in the convoy and with a command and control center. The IED actuator position, $x_a$, $y_a$, and $z_a$, is determined from a position of each vehicle is $x_1$, $y_1$, $z_1$; $x_2$, $y_2$, $z_2$; and $x_3$, $y_3$, $z_3$ respectively, an orientation reference is provided according to $TN_1$, $TN_2$, and $TN_3$, interferometric target direction is given as $\theta_1$, $\theta_2$, and $\theta_3$, and the time reference for each clock is given as $T_1$, $T_2$, and $T_3$. In a general example, radios within at least three different vehicles transmit this information to the command and control center where it used to accurately determine the coordinates $x_a$, $y_a$, and $z_a$.

Determination of the location of an IED actuator is provided in that the capability to measure the frequency of the actuator signal is provided by the receiver channels and then the direction from the vehicle to the actuator is determined using interferometer techniques from two or more antennas. The measured direction to the actuator, the vehicle x, y, z coordinate from IMU/GPS 330, a north direction reading from the IMU/GPS or heading/orientation sensor, and the GPS time can then be transmitted to the command and control center 300. With three vehicles providing their measured information, the actuator $x_a$, $y_a$, $z_a$ position can then be determined.

Figure 7:
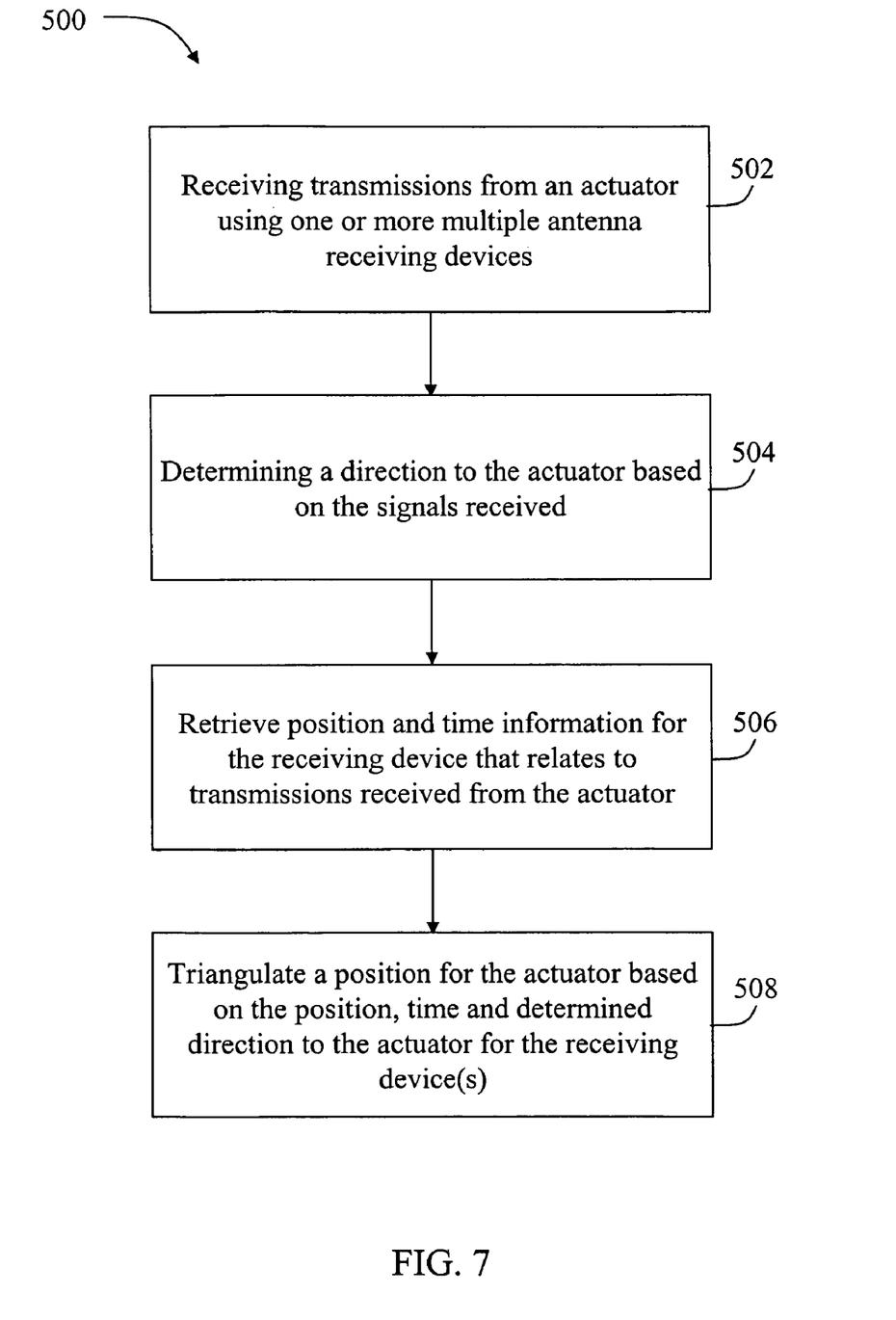
FIG. 7 is flowchart illustrating a method for determining a location of an actuating device that transmits a signal.

FIG. 7 is therefore a flowchart 500 that summarizes the above described IED actuator location method. Transmissions are received 502 from the IED actuator utilizing at least one multiple antenna receiving device and a direction to the IED actuator is determined 504 based on the signals received. Position and time information is retrieved 506 for the at least one multiple antenna receiving device relating to each transmission received from the actuator, and the position of the actuator is triangulated 508 based on the position, time, and determined direction to the actuator for the at least one multiple antenna receiving device.

While the invention has been described in terms of various specific embodiments, those skilled in the art will recognize that the invention can be practiced with modification within the spirit and scope of the claims.

The invention claimed is:

1. A method for determining the location of an actuator, comprising:
   providing a broadband jammer comprising:
      a plurality of frequency generators each of which produce a frequency range that is different from others of the frequency generators;
      one or more multiplexers configured to receive the frequency range from each of the frequency generators;
      one or more power amplifiers configured to receive an output signal from the one or more multiplexers;
      one or more filters configured to receive an output signal from the one or more amplifiers, the one or more filters having pass bands corresponding to the different frequency ranges;
   receiving transmission signals from the actuator utilizing a plurality of multiple channel receiving devices coupled to the broadband jammer, the multiple channel receiving devices each tuned to one of the different frequency ranges, the multiple channel receiving devices each coupled to at least two antennas, wherein at least one of the antennas comprises a broadband antenna;
   determining a direction to the actuator based on the transmission signals received;
   retrieving position, orientation, and time information for the plurality of multiple channel receiving devices relating to each transmission signal received from the actuator; and
   triangulating the position of the actuator based on the position, orientation, time, and determined direction to the actuator for the plurality of multiple channel receiving devices.

2. A method according to claim 1 wherein determining a direction to the actuator comprises utilizing a time difference of arrival of the actuator signal to each antenna of a multiple channel receiving device to determine a quadrant in which the actuator is located.

3. A method according to claim 1 wherein determining a direction to the actuator comprises determining a phase difference between the signals received at each antenna for each multiple channel receiving device.

4. A method according to claim 3 wherein determining a phase difference comprises utilizing a multiple channel receiving device which incorporates at least three antennas to provide unambiguous phase differences in the signals received at the antennas.

5. A method according to claim 1 wherein retrieving position, orientation, and time information comprises receiving at least one of GPS information and inertial measurement unit information.

6. A method according to claim 1 wherein receiving signals from the actuator comprises configuring the plurality of multiple channel receiving devices to receive signals in a plurality of frequency bands.

7. A method according to claim 1 further comprising:
determining characteristics of the transmission signals received; and
transmitting a signal configured to jam the signals transmitted by the actuator.

8. A method according to claim 1 wherein triangulating the position of the actuator based on the position, orientation, time, and determined direction to the actuator comprises transmitting position, orientation, time, and determined direction to the actuator to a command and control center.

9. A system for determining the location of an actuating device comprising:
a broadband jammer comprising:
a plurality of frequency generators each of which produce a frequency range that is different from others of the frequency generators;
one or more multiplexers configured to receive the frequency range from each of the frequency generators;
one or more power amplifiers configured to receive an output signal from the one or more multiplexers;
one or more filters configured to receive an output signal from the one or more amplifiers, the one or more filters having pass bands corresponding to the different frequency ranges;
a plurality of receivers each tuned to one of the different frequency ranges and comprising at least two channels;
at least two antennas coupled to each of the receivers and corresponding to each channel, said antennas of each said receiver separated by a distance, at least one of said antennas comprising a broadband antenna, each of said receivers separated by a distance, each said receiver configured to utilize signals received at each said antenna to determine a direction to the actuating device; and
a controller configured to receive the actuating device direction from each of said receivers, said controller further configured to receive position, orientation, and time information from a location of each of said receivers, said controller configured to determine a position of the actuating device, based on the direction to the actuating device and the position, orientation, and time information as determined for each said receiver.

10. A system according to claim 9 wherein to determine a direction to the actuating device, said receivers are programmed to utilize a time difference of arrival of an actuating device signal to each said antenna to determine a quadrant in which the actuating device is located.

11. A system according to claim 9 wherein said receivers are configured to determine a direction to the actuating device utilizing a phase difference between signals received at each said antenna.

12. A system according to claim 9 wherein at least one of said receivers comprises three said channels and corresponding said antennas, said three channel receiver configured to utilize the phase differences between the signals received at each respective said antennas to determine an unambiguous phase difference between the signals received by said antennas.

13. A system according to claim 9 further comprising an inertial measurement unit located in a proximity of each of said receivers, said inertial measurement unit configured to provide position and orientation information for a respective said receiver to said controller.

14. A system according to claim 9 further comprising a global positioning system located in a proximity of each of said receivers, said global positioning system configured to provide time information for a signal received by a respective said receiver to said controller.

15. A system according to claim 9 wherein said receivers are configured to receive and process signals in a plurality of frequency bands.

16. A system according to claim 9 wherein said system further comprises at least one transmitter, said receivers configured to determine the characteristics of transmission signals received from an actuating device and cause said at least one transmitter to transmit a signal configured to jam the signals received from the actuating device.

17. A system according to claim 9 wherein to determine a position of the actuating device, said controller is configured to triangulate the position of the actuating device based on a position and orientation of said receivers, a time each said receiver received a transmission from the actuating device, and a determined direction to the actuating device received from each said respective receiver.

18. A jamming device for determining a direction to an improvised explosive device (IED) actuator, said jamming device comprising:
a broadband jammer comprising:
a plurality of frequency generators each of which produce a frequency range that is different from others of the frequency generators;
one or more multiplexers configured to receive the frequency range from each of the frequency generators;
one or more power amplifiers configured to receive an output signal from the one or more multiplexers;
one or more filters configured to receive an output signal from the one or more amplifiers, the one or more filters having pass bands corresponding to the different frequency ranges;
a broadband antenna coupled to the one or more filters;
a plurality of receivers each tuned to one of the different frequency ranges, the receivers each comprising:
a first pre-amplifier configured to receive IED actuator signals from the broadband antenna;
a second pre-amplifier configured to receive IED actuator signals from a second antenna;
a first mixer coupled to the first pre-amplifier and configured to receive a frequency from a voltage controlled oscillator;
a second mixer coupled to the second pre-amplifier and configured to receive a frequency from the voltage controlled oscillator;
a first amplifier configured to receive an output signal from the first mixer;
a second amplifier configured to receive an output signal from the second mixer; and
a phase comparator configured to receive an output signal from each of the first and second amplifiers; and a controller operatively coupled to the phase comparator, the controller configured to:

receive transmissions relating to the direction to the IED actuator;

receive transmissions relating to a position and orientation of the plurality of receivers and a time at which each receiver received signals from the IED actuator; and determine a position of the IED actuator, based on a direction to the IED actuator and position, orientation, and time information received for each receiver providing the direction to the IED actuator.

19. A jamming device according to claim 18 wherein to determine a position of the IED actuator, said controller is configured to triangulate the position based on a plurality of received transmissions relating to the direction to the IED actuator and a plurality of received transmissions relating to a position of a receiver and the times at which the receiver received the signals from the IED actuator.

* * * * *